United States Patent
Riccardella

(10) Patent No.: US 9,539,530 B2
(45) Date of Patent: Jan. 10, 2017

(54) PRESSURE DIFFERENTIAL INDICATOR

(71) Applicant: Standex International Corporation, Salem, NH (US)

(72) Inventor: Christopher Riccardella, Springboro, OH (US)

(73) Assignee: STANDEX INTERNATIONAL CORPORATION, Salem, NH (US)

( * ) Notice: Subject to any disclaimer, the term of this patent is extended or adjusted under 35 U.S.C. 154(b) by 163 days.

(21) Appl. No.: 14/547,506

(22) Filed: Nov. 19, 2014

(65) Prior Publication Data

US 2015/0144053 A1    May 28, 2015

Related U.S. Application Data

(60) Provisional application No. 61/907,543, filed on Nov. 22, 2013.

(51) Int. Cl.

| | |
|---|---|
| *B01D 35/143* | (2006.01) |
| *G01L 7/16* | (2006.01) |
| *G01L 9/00* | (2006.01) |
| *G01L 19/08* | (2006.01) |
| *G01L 19/14* | (2006.01) |

(52) U.S. Cl.
CPC ............... *B01D 35/143* (2013.01); *G01L 7/16* (2013.01); *G01L 9/0089* (2013.01); *G01L 19/083* (2013.01); *G01L 19/142* (2013.01)

(58) Field of Classification Search
CPC ........ B01D 35/143; G01L 7/16; G01L 19/142; G01L 19/083; G01L 9/0089
USPC ........ 116/201, 264, 266–268, 271–274, 291; 73/716, 736, 644
See application file for complete search history.

(56) References Cited

U.S. PATENT DOCUMENTS

| | | | | |
|---|---|---|---|---|
| 3,980,040 A | * | 9/1976 | Read ....................... | G01L 7/163 116/267 |
| 4,153,003 A | * | 5/1979 | Willis ...................... | G01L 7/16 116/268 |
| 4,316,801 A | * | 2/1982 | Cooper ................ | B01D 35/143 210/133 |
| 4,480,160 A | | 10/1984 | Stiffelman | |
| 4,574,728 A | * | 3/1986 | Barnard, Jr. ......... | B01D 35/143 116/267 |
| 4,651,670 A | * | 3/1987 | Silverwater ............. | G01L 19/12 116/267 |

(Continued)

*Primary Examiner* — R. A. Smith
*Assistant Examiner* — Tania Courson
(74) *Attorney, Agent, or Firm* — William B. Ritchie

(57) ABSTRACT

A pressure differential indicator that eliminates the risk of providing a false positive due to fluid contamination. The invention has an electrically insulated barrier between the "hot" pin and the grounded housing without the need for a hermetic seal. The indicator can be manufactured at a greater efficiency and lower cost than is found with prior art pressure differential indicators. It has a piston that can be easily oriented to yield either a normally closed or normally open position. The indicator has at least one protrusion on a plastic overmold to engage the swage collar and resist axial rotation of the pin. A pressure seal interrupting the plastic overmold sections and exposing the underlying metal to allow for an O-ring seal with no potential leak path between plastic and metal. Finally, the pressure differential indicator has all moving components contained within a single cavity.

4 Claims, 9 Drawing Sheets

(56) References Cited

U.S. PATENT DOCUMENTS

| | | | |
|---|---|---|---|
| 6,428,708 B1 * | 8/2002 | Halemba | B01D 29/603 210/100 |
| 6,604,486 B1 * | 8/2003 | Krisko | B01D 46/0086 116/268 |
| 7,308,829 B1 | 12/2007 | Beard et al. | |
| 7,886,610 B2 * | 2/2011 | Gustafson | G01L 9/0089 73/736 |

* cited by examiner

PRESSURE DIFFERENTIAL INDICATOR

This application claims benefit of U.S. Provisional Application Ser. No. 61/907,543, filed November 2013, pursuant to 35 USC §119(e).

FIELD OF THE INVENTION

This invention relates to pressure differential indicators, in particular, pressure differential indicators that determine when a fluid filter needs to be changed or cleaned by eliminating a false positive indication resulting from fluid contamination. When the fluid filter can no longer function to provide clean fluid downstream of the filter mechanism, the indicator will show this by measuring the downstream pressure and comparing it to upstream pressure.

BACKGROUND OF THE INVENTION

In the hydraulic field, filters are used to clean the hydraulic fluid from various contaminants occurring within a system. When the filter is plugged with much of this contamination that it can no longer function to provide clean fluid and must be cleaned or changed, a pressure differential indicators is used to make that determination.

In most cases, the pressure differential indicator uses a spring-loaded piston that is placed in the hydraulic line with one end connected upstream of the filter and the other end downstream. When the pressure is great enough to compress the spring associated with the piston, the piston will then activate the indicator to show that the pressure differential across the filtering system is sufficient to indicate a clean/replace condition has been reached.

Typical of this type of device is U.S. Pat. No. 4,480,160, issued to Stifelman on Oct. 30, 1984. In this device, a conductive path is formed within the fluid of a single cavity that is used to indicate the clean/change condition. However, electrically conductive contamination can result in a false positive. This device has open contacts, which are exposed to the free flow of fluid, in and out of the sensor. Thus, the risk of failure due to contamination is present. Further, this device uses a glass to metal hermetic seal to insulate the electrically conductive pin from the grounded body of the device. This type of seal is costly and labor intensive which increases substantially the cost of the unit. Finally, this device impacts the downstream (clean) fluid flow in the hydraulic filtering system.

Another device, again typical for this type of indicator, is disclosed in U.S. Pat. No. 7,308,829, issued to Beard et al on Dec. 19, 2007. This device is similar in construction to the one disclosed in the '160 patent, that is, it also has a spring-loaded piston. As found in the '160 patent, open contacts; which are exposed to conductive contamination false positives, are present. This device relies on an air gap or potting to insulate an electrically conductive pin from the grounded body. The air gap puts the sensor at a significant risk for having a short circuit. The potted version has the potential for the epoxy used for potting to wick into the contact area and render the indicator ineffective. Also, with the intricacies of multiple compartments with multiple electrical contacts, the cost of manufacture is unnecessarily high. This device also impacts the downstream (clean) fluid flow in the filtering system.

There is not found in the prior art a pressure differential indicator using a spring-loaded piston method that eliminates the deficiencies noted above and that can be used in a normally closed or open position to indicate the need to change a filter yet is easy and inexpensively manufactured.

SUMMARY OF THE INVENTION

It is an aspect of the invention to provide a pressure differential indicator that eliminates the risk of providing a false positive as a result of fluid contamination.

It is still another aspect of the invention to provide a pressure differential indicator that has an electrically insulated barrier between the "hot" pin and the grounded housing without the need for a hermetic (glass to metal) seal or using an O-ring or potting barrier.

Another aspect of the invention is to provide a pressure differential indicator that can be manufactured at a greater efficiency and lower cost than is found with prior art pressure differential indicators.

It is an aspect of the invention to provide a pressure differential indicator that features an electrically conductive piston that makes contact with the conducting pin.

Still another aspect of the invention is to provide a pressure differential indicator that the piston can easily be oriented to yield either a normally closed or normally open position.

Another aspect of the invention is to provide a pressure differential indicator that has at least one protrusion on the plastic overmold to engage the swage and resist axial rotation of the pin.

Still another aspect of the invention is to provide a pressure differential indicator that has a pressure seal interrupting the plastic and exposing the underlying metal to allow for an O-ring seal with no potential leak path between plastic and metal.

Finally, it is an aspect of the invention to provide a pressure differential indicator that has all moving components contained within a single cavity.

DETAILED DESCRIPTION OF THE INVENTION

Figure 1:
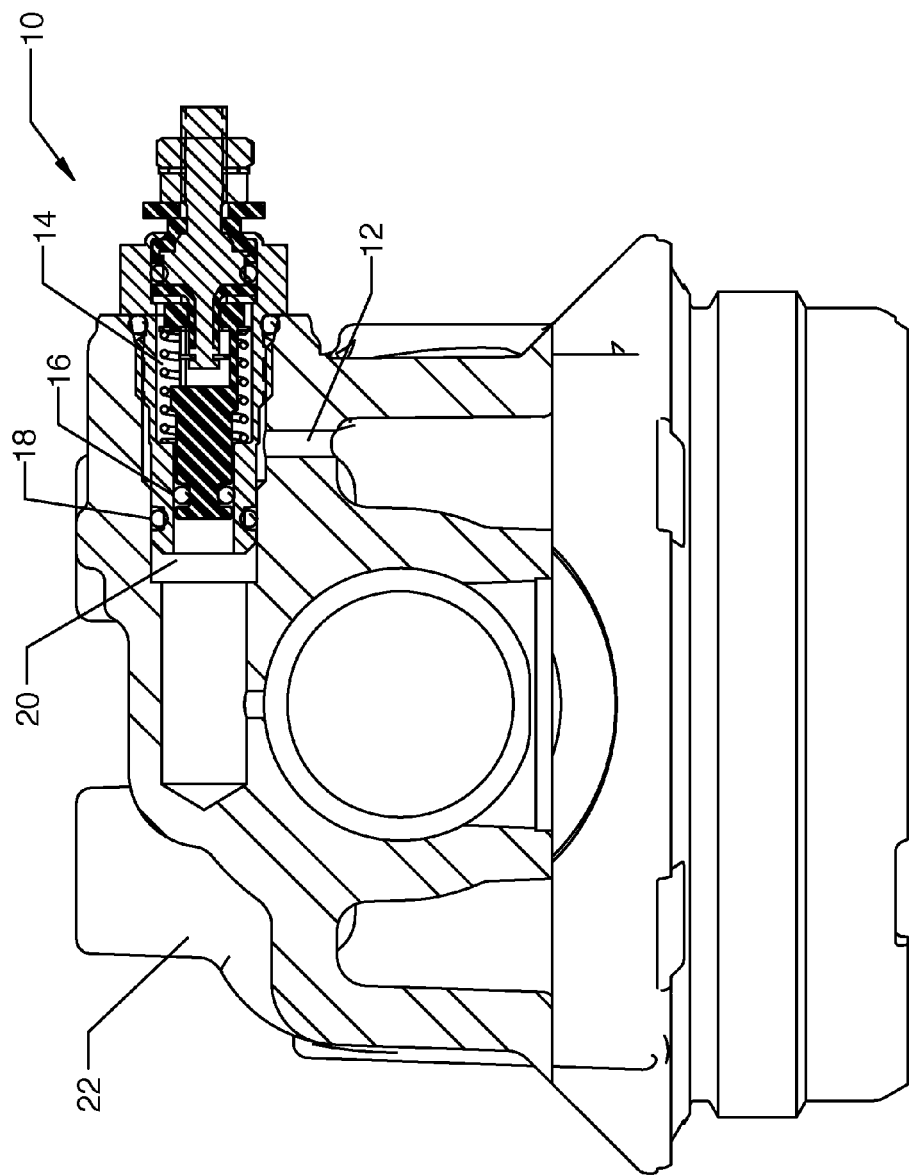
FIG. 1 is a cross-sectional view of the pressure differential indicator threaded into a filter manifold in accordance with the invention.

Referring now to FIG. 1, invention 10 is shown in a typical installation where the state of an oil filter (not shown) can be determined by measuring the pressure differential that occurs across the filter as the filter begins to clog up due to contaminants building up in the filter. As can be seen, pressure differential indicator 10 is inserted into oil filter manifold 22 by securely screwing invention 10 into the threaded opening in manifold 22 via threaded section 43 using hexagonal nut section 41 much as you would install a spark plug into a manifold on an engine. The pressure is monitored between the upstream/dirty oil port 12 and the downstream/clean oil port 20. O-rings 16 and 18 seal the upstream fluid from the downstream fluid. As the oil filter becomes clogged, differential pressure indicator 10 will change states in accordance with a predetermined pressure differential, which will correspond to the point in time when the filter is so clogged that it needs to be changed.

Figure 2:
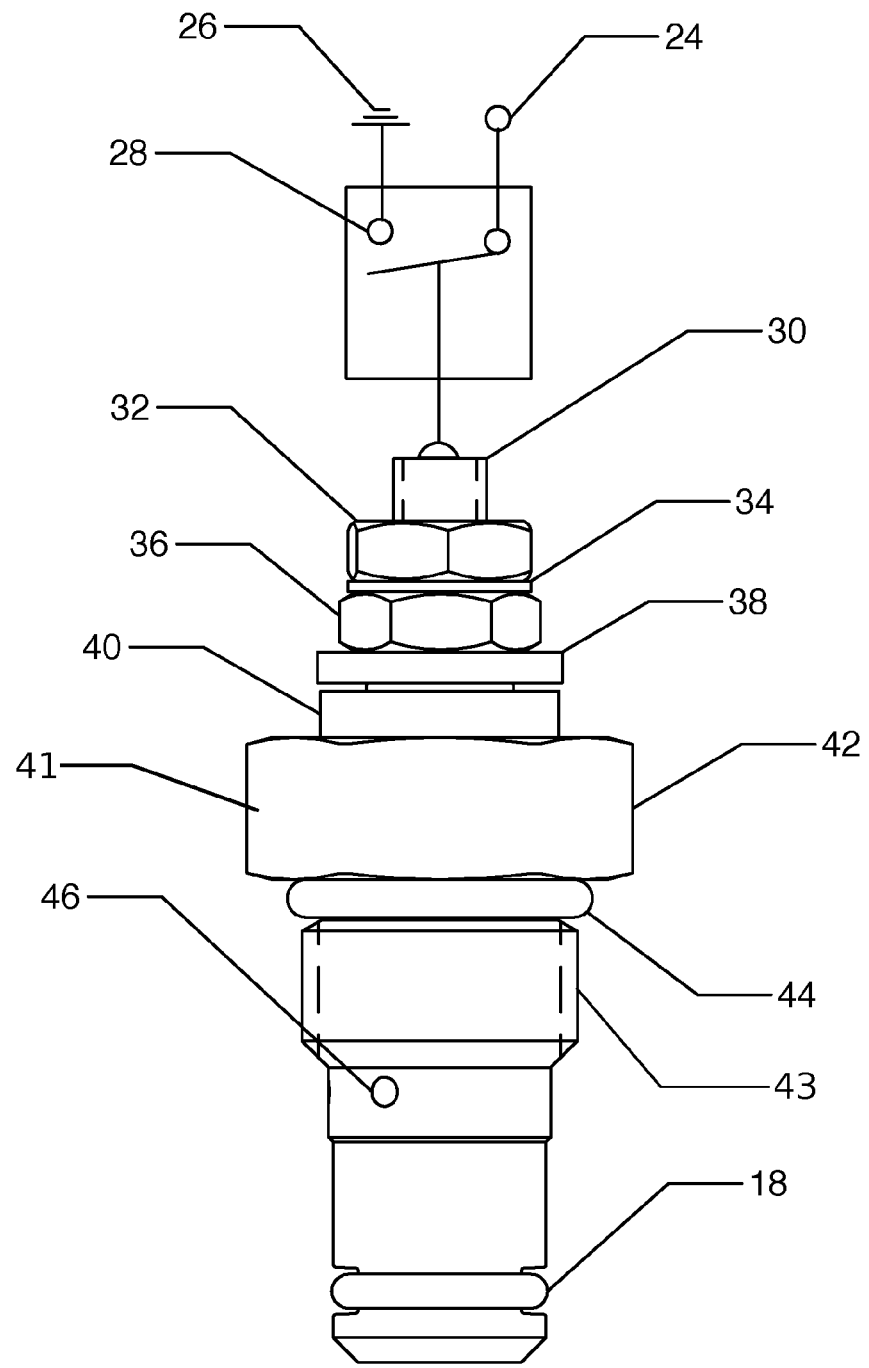
FIG. 2 is a front view of the pressure differential indicator.

Referring now to FIG. 2, the side of invention 10 is illustrated. Invention 10 is connected to power source 24 and Ground 26 to complete the circuit. The operating orientation of differential pressure indicator 10 can be easily changed from a normally "open" logic to a normally "closed" logic by biasing electrical connection 28 during steady state operation. Nuts 32 and 36 and lock washer 34 are used to secure a wire (not shown) to pin 30 to power invention 10. Plastic washer 38 insulates conductive pin 30 from housing 42, which is grounded. Swage collar 40 of housing 42 keeps pin 30 and its components secured axially within housing 42. O-ring 44 prevents dirty oil from escaping the hydraulic system. O-ring 18 prevents dirty oil from mixing with clean oil. High-pressure port 46 is in communication with dirty oil port 12 so that the pressure in the dirty oil indicating the degree that the oil filter is clogged can be determined.

Figure 3A:
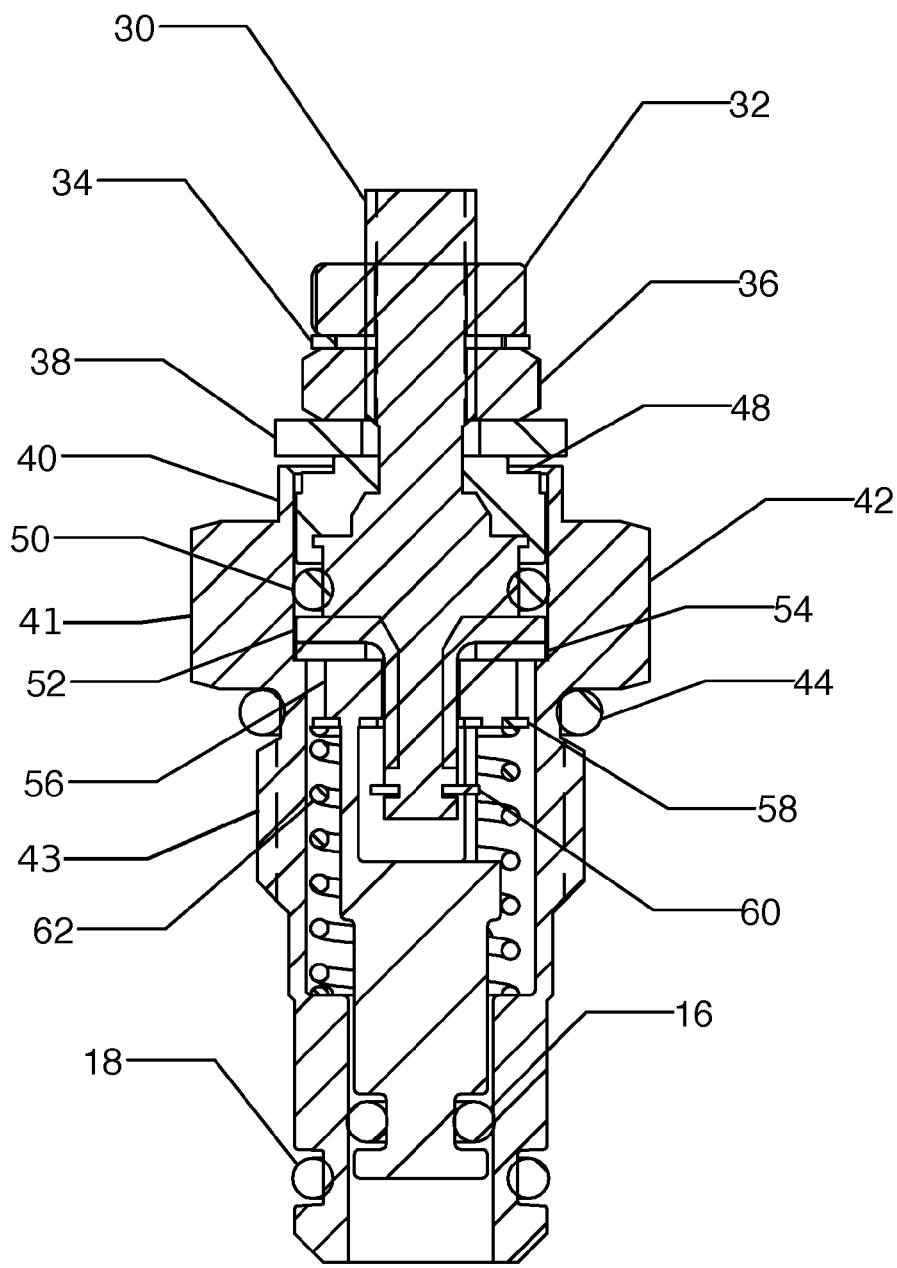
FIG. 3A is a cross-sectional view of a normally open pressure differential indicator depicted in the open, zero pressure state.

FIG. 3A shows invention 10 in a normally open position. That is, the electrical circuit of invention 10 is an open circuit. Housing 42 is grounded. If piston 56 is made from an insulating material, then washer 58 must be electrically conducting. In this configuration, conducting pin 30 and conducting e-clip 60 is not in contact with washer 58, so the circuit is open. However, as piston 56 moves along pin 30 in response to increasing pressure which compresses spring 62, e-clip 60 eventually contacts washer 58 as shown in FIG. 3B; thus the circuit is completed, thus indicating the filter needs to be changed.

It is an important feature of differential pressure indicator 10 to prevent a false signal due to the contamination of the fluid. As shown in FIG. 3A, overmold half B 52 insulates piston 56 from conductive washer 38. As a result, invention 10 is prevented from shorting due to contamination of the fluid. Note that pin 30 is sealed radially inside housing 42 which is grounded and secured axially via swage collar 40. Overmold half A 48 and overmold half B 52 insulates pin 30 which locates pin 30 both radially and axially within invention 10.

To summarize, the electrical circuit is open when pin 30 (serving as an electrode having an electrical potential) is not electrically connected to housing 42 which functions as an electrode having a second electric potential different than the first found in pin 30. The circuit is closed when pin 30 is electrically connected to housing 42, thus having a uniform electrical potential throughout differential pressure indicator 10. The flow path of electricity is such that in a normally open state, the following have uniform electrical potential: nut 32, lock washer 34, nut 36, and e-clip 60. The following have a second electrical position in the same open state: piston 56, contact washer 58, spring 62, and housing 42.

Figure 3B:
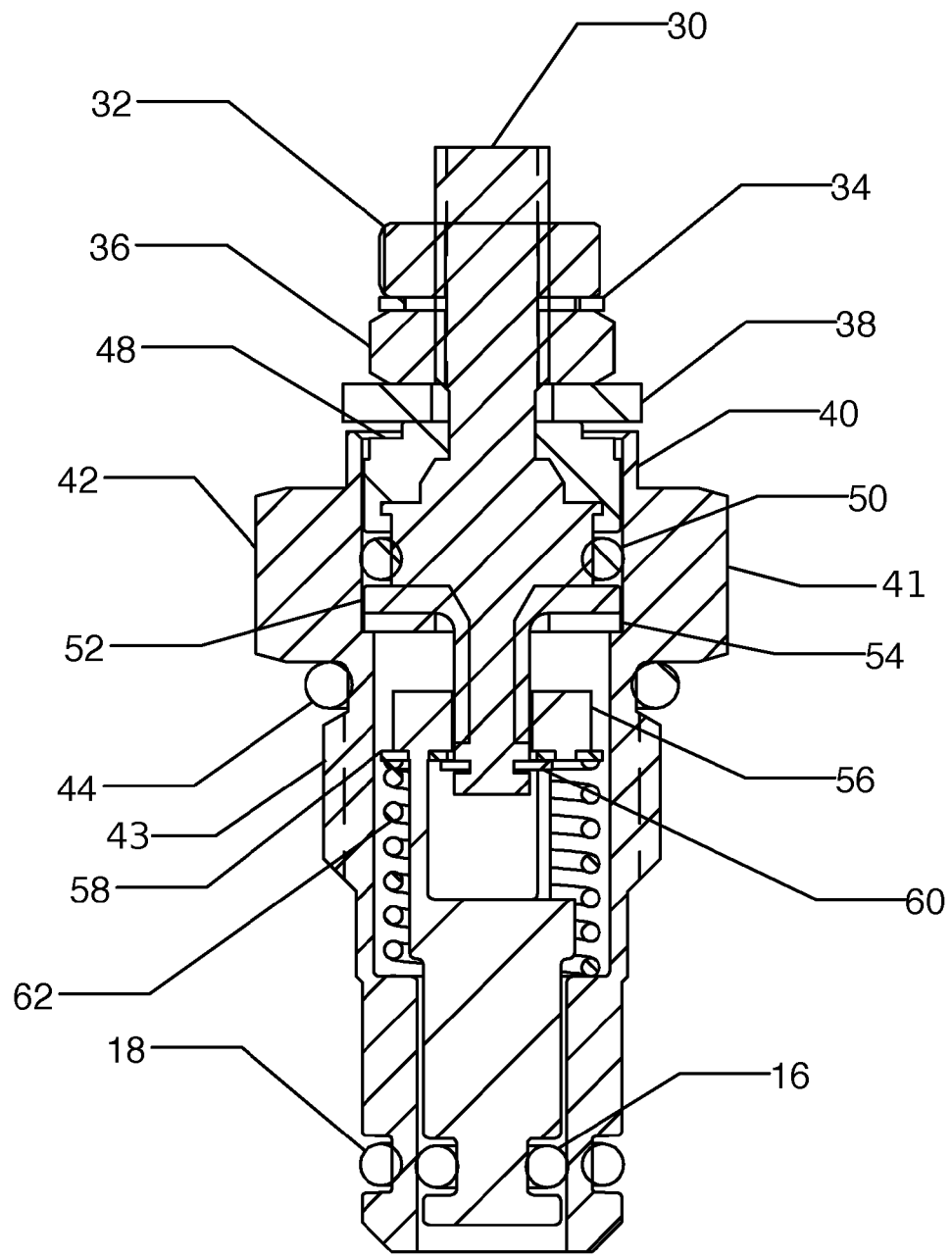
FIG. 3B is a cross-sectional view of the pressure differential indicator shown in FIG. 3A depicted in the closed, pressurized state.

As shown in FIG. 3B, pressure differential indicator is in position, where the electrical circuit is closed. When the pressure differential becomes sufficient to overcome spring 62 biasing the "open" circuit condition, contact washer 58 and piston 56 make contact with e-clip 60. At this moment, differential pressure indicator 10 has a uniform electrical potential, thus signaling a controller (not shown) that the filter media must be changed.

Figure 4A:
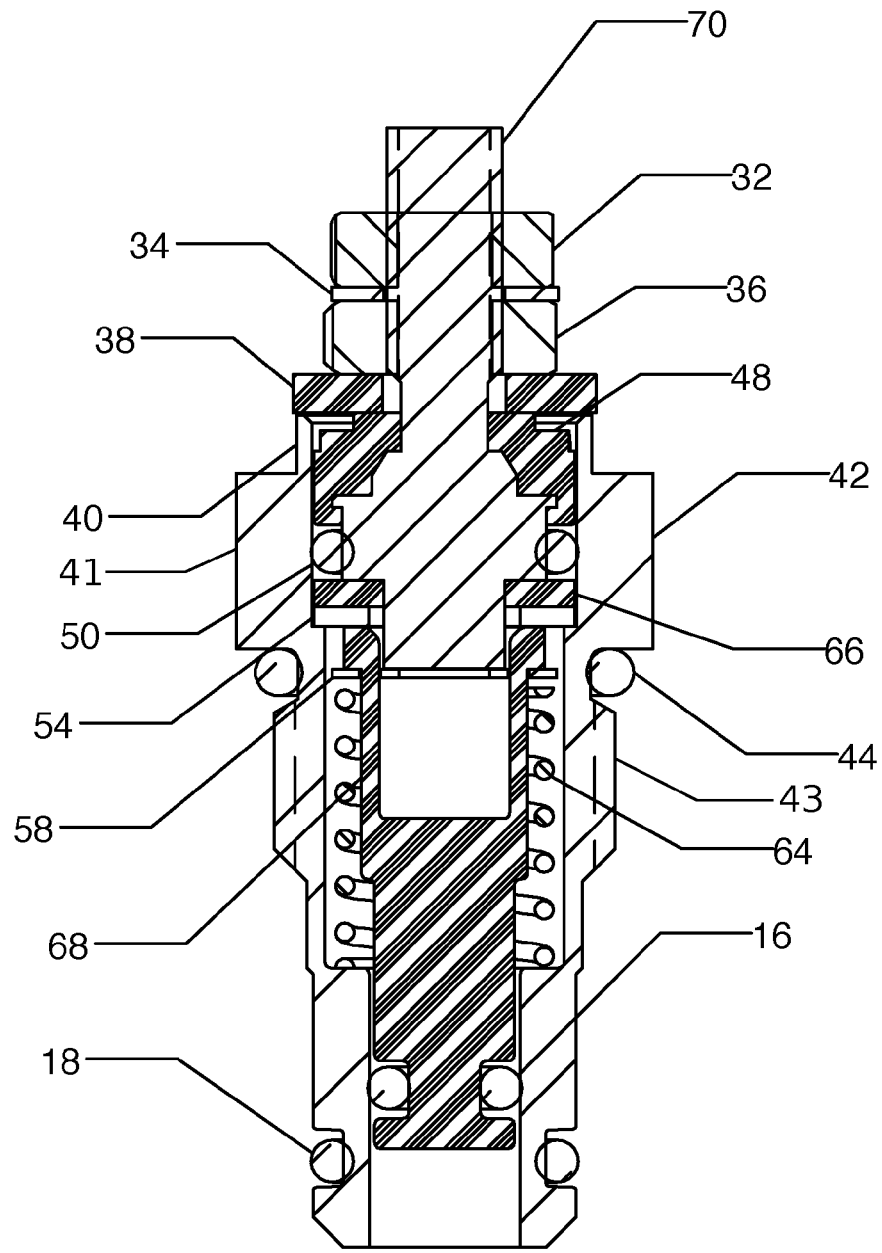
FIG. 4A is a cross-sectional view of an alternative embodiment for a normally closed pressure differential indicator depicted in the closed, zero pressure state in accordance with the invention.

As shown in FIG. 4A, an alternative embodiment of differential pressure indicator is possible having the invention using a normally "closed" logic. Many of the parts are the same as this embodiment, especially brass housing 42 which accounts for about 60 to 65% of the total cost of the unit. By merely switching piston 68 for piston 56 and conductive pin 70 for pin 30 and spring 64 for spring 62, differential pressure indicator 10 is able to provide an indicator wherein the electrical circuit is normally complete until the contamination becomes great enough to have the circuit open.

The electrical circuit for this embodiment is as follows: The circuit is closed when pin 70 (serving as an electrode having an electrical potential) is electrically connected to housing 42 which functions as a second electrical node having the same electrical potential. The flow path of electricity is such that in a normally closed state all components of indicator 10 have a uniform electrical potential.

Figure 4B:
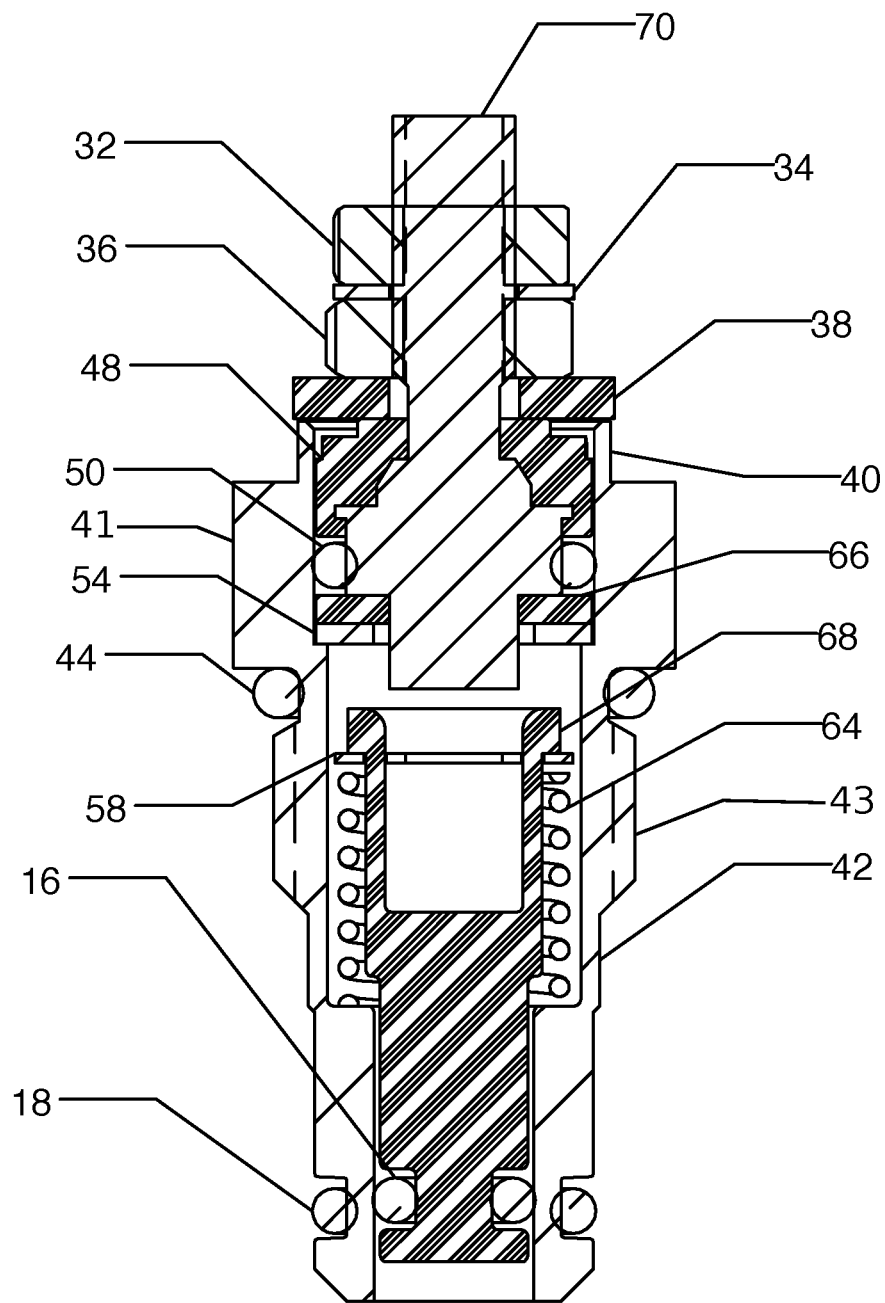
FIG. 4B is a cross-sectional view of the pressure differential indicator shown in FIG. 4A depicted in the open, pressurized state.

Now referring to FIG. 4B, when the pressure differential becomes substantial enough to overcome spring 64 bias, contact washer 58 and piston 68 pull away from pin 70. This gap isolates the two electrical nodes; that is, isolates pin 70 and housing 42 from each other, thereby, creating two different electrical potentials and indicating that the filter media must be changed.

Figure 5:
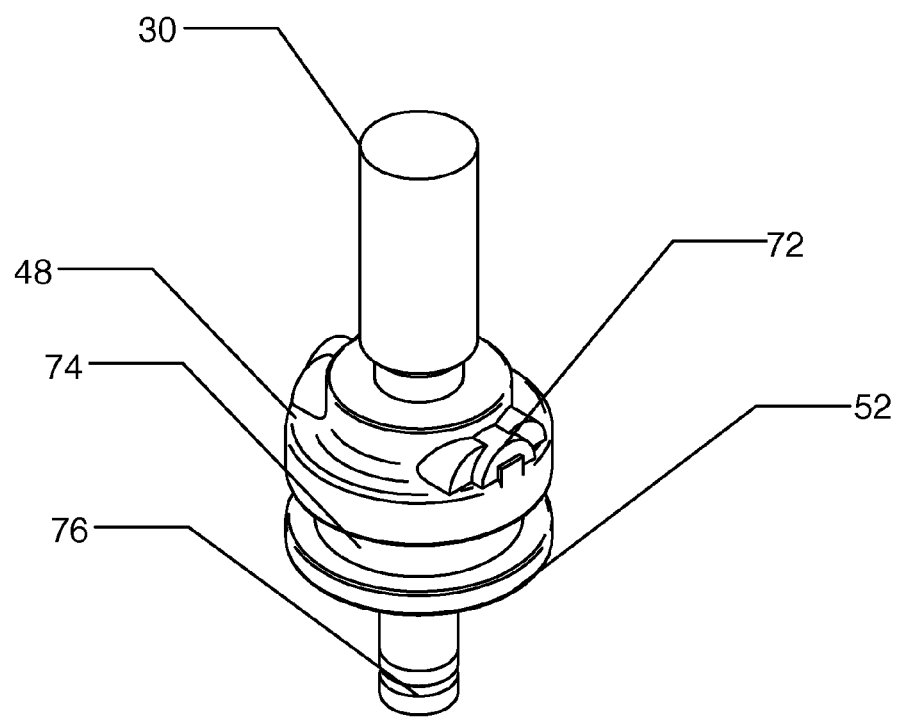
FIG. 5 is an isometric view of the overmolded contact pin.

Again, referencing the preferred embodiment, FIG. 5 shows a detailed view of the overmold sections. Electrically conductive pin 30 is shown with overmold half A 48 and overmold half B 52. The overmolds A 48 and B 52 are constructed out of moldable, electrically insulating material that is used to located pin 30 while at the same time electrically isolating housing 42 from pin 30.

An imperfect seal between the dielectric material making up half A 48 and half B 52 and conducting pin 30 is inherent to the molding process. To counter this problem, these two parts were split into two components with an O-ring groove 74 in between the two halves.

As shown in FIG. 3A, O-ring 50 seals overmold half A 48 and the internal diameter of housing 42. O-ring 50 also seals between overmold half A 48 and conductive pin 30. As previously noted, overmold half B 52 also serves as dielectric material to increase the gap between the two electric potentials.

Crush ribs 72 serve as a mechanical interaction between swage collar 40 (See FIG. 3A) and the pin assembly: conducting pin 30, overmold half A 48, overmold half B 52 and e-clip 60. By the deforming material, the resistance of pin 30 to spin radially within housing 42 is increased substantially. This is particularly important when installing nuts 32 and 36 and lock washer 34. If the installer is not able to apply the proper amount of torque when making the electrical connection, there is a risk of a broken connection during typical operation. A failed connection, of course, would render indicator 10 inoperable. E-clip groove 76 must remain free of non-conductive material, as conducting e-clip 60 must make sufficient contact with conducting pin 30.

Figure 6A:
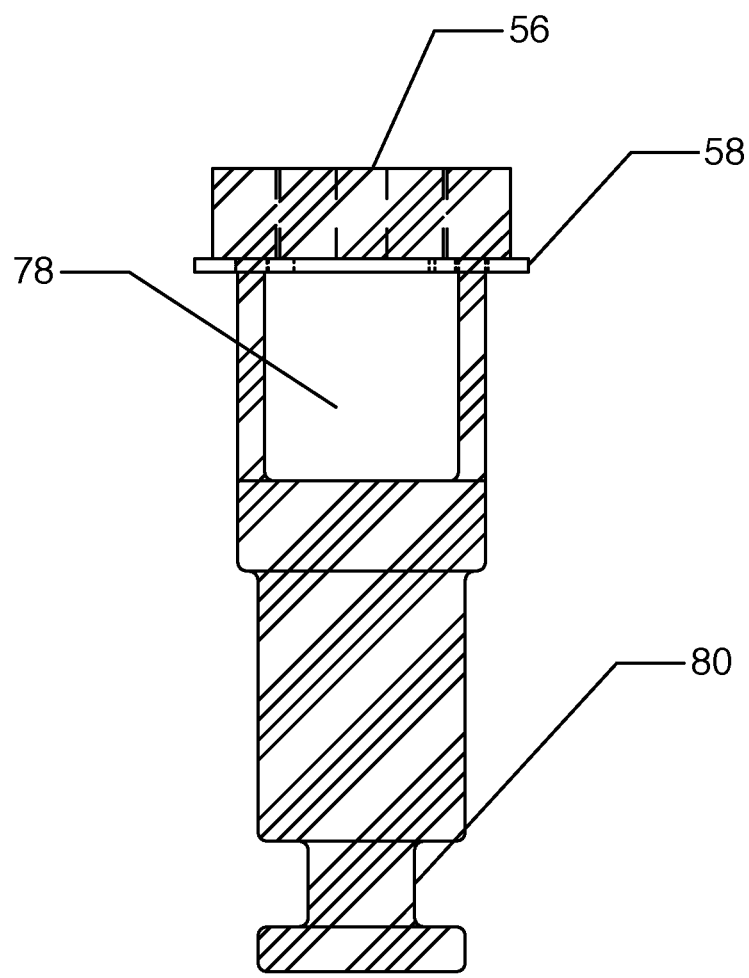
FIG. 6A is a front view of the conductive piston.
Figure 6B:
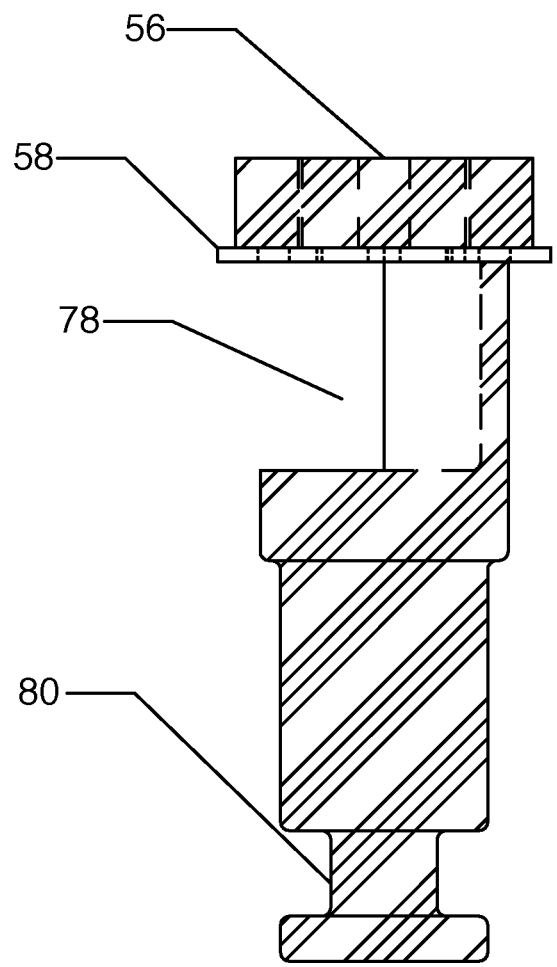
FIG. 6B is a side view of the conductive piston.

FIGS. 6A and 6B illustrates piston 56 in the preferred embodiment of the normally open configuration. Piston 56 is molded with conductive washer 58. Contact cavity 78 is important to invention 10 because it serves to contain contact washer 58 and e-clip 60. By having cavity 78, e-clip 60 can be installed after the installation of piston 56 on pin 30. O-ring groove 80 is designed such that dirty fluid pressure chamber 14 shown in FIG. 1 can be sealed internally from the clean fluid/low pressure portion of filter manifold 22. O-ring 16 is designed such that piston 56 can be dynamically sealed while allowing axial motion of piston 56.

Although the present invention has been described with reference to certain preferred embodiments thereof, other versions are readily apparent to those of ordinary skill in the preferred embodiments contained herein.

What is claimed is:

1. A pressure differential indicator for a fluid filter having a manifold associated therewith, wherein said manifold having a threaded section in communication with a downstream clean fluid port and an upstream dirty fluid port, said pressure differential indicator comprising:
    a cylindrical hollow metal electrical conductive housing which is grounded, said housing having a manifold end and a pin end as well as a threaded section between the pin end and the manifold end of said housing and, said housing having a hexagonal nut section machined therein, wherein said housing screws into the threaded section of the manifold associated with the fluid filter by using said hexagonal nut section and wherein said housing further having an external first O-ring and an internal first O-ring adjacent to the manifold end wherein said first external and first internal O-rings separate the downstream fluid from the upstream fluid;
    a electrically conductive pin having a power end and a piston end wherein said pin provides electrical power to said pressure differential indicator;
    a non-conducting washer encircling said pin to electrically insulates said pin from said housing which is grounded;
    a swage collar on said housing, immediately adjacent to said non-conducting washer and also encircling said pin to keep said pin axially secured with said housing;
    a second external O-ring immediately adjacent to said hexagonal nut section encircling said housing wherein said second external O-ring wherein said second external O-ring prevent dirty fluid from escaping;
    a high pressure port in said housing positioned between said second external O-ring and said first external O-ring wherein said high pressure port is in communication with the upstream dirty fluid port of said manifold such that the pressure differential between the downstream clean fluid port and the upstream dirty fluid port can be measured;
    a non-conducting piston connected to said pin via a conducting e-clip;
    a conducting washer encircling said piston wherein said conducting washer is in electrical contact with said housing;
    a compression spring surrounding said piston and urging said piston away from said conducting washer thus providing an open circuit until the pressure at said high pressure port in said housing is sufficient to bias said spring, thus allowing said piston to move wherein said conducting e-clip contacts said conducting washer thus providing a closed circuit wherein said pressure differential indicator indicates the fluid filter should be changed.

2. The pressure differential indicator of claim 1 further comprising:
    a first overmold half section surrounding said piston thus insulating said piston from said conductive washer thus preventing a short circuit by the dirty fluid that may be conducting due to the contaminants in the dirty fluid.

3. The pressure differential indicator of claim 2 further comprising:
    a second overmold half section in combination with said first overmold half section wherein said first and second overmold half section insulates said pin and locates said pin both radially and axially within said housing.

4. The pressure differential indicator of claim 3 wherein said overmold sections are constructed out of moldable electrically insulating material such that an imperfect seal is provided between said first and second overmold inherent in the molding process such that the seal is improved by providing a third O-ring placed between said first and second overmold sections.

* * * * *